No. 608,124. Patented July 26, 1898.
C. W. HUNT.
ROPE COUPLING.
(Application filed Dec. 29, 1897.)
(No Model.)
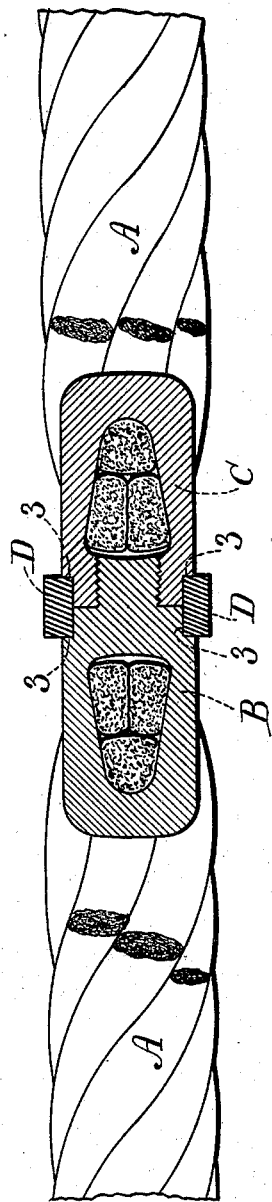
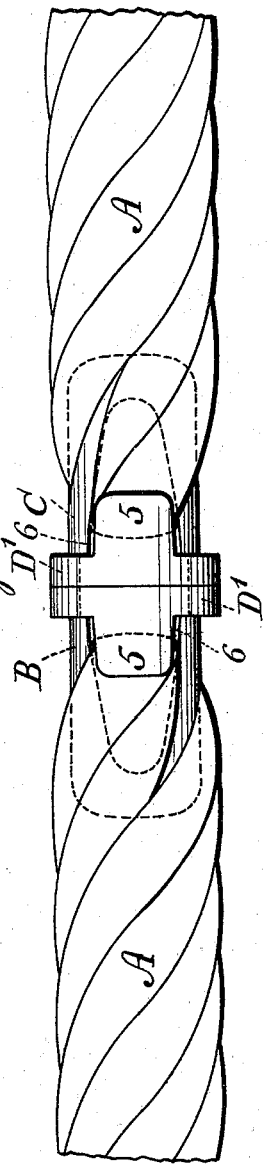
Witnesses:
J. Staib
Chas H. Smith
Inventor:
Charles W. Hunt
per L. W. Serrell & Son
Attys.

UNITED STATES PATENT OFFICE.

CHARLES W. HUNT, OF NEW YORK, N. Y.

ROPE-COUPLING.

SPECIFICATION forming part of Letters Patent No. 608,124, dated July 26, 1898.

Application filed December 29, 1897. Serial No. 664,406. (No model.)

*To all whom it may concern:*

Be it known that I, CHARLES W. HUNT, a citizen of the United States, residing at New York, (West New Brighton,) in the county of Richmond and State of New York, have invented an Improvement in Rope-Couplings, of which the following is a specification.

The ends of ropes have been brought together and united by means of metallic couplings, and these couplings have had eyes through which the strands of the rope have been passed, and the metallic couplings have been screwed or otherwise connected together. The end portions, however, of the ropes immediately adjacent to the couplings are separated to a greater or less extent. Consequently when the coupling passes a pulley the rope does not have a uniform bearing.

The object of the present invention is, primarily, to prevent undue wear at the end portions of the rope immediately adjacent to the coupling and also to maintain uniformity of tension upon the rope by the coupling being enlarged to correspond in diameter to the rope itself. In carrying out this object a ring or sleeve of vulcanized rubber, rawhide, or similar material is employed around the middle of the coupling, such ring or sleeve being of an external diameter corresponding, or nearly so, to the diameter of the end portions of the rope and secured between the two parts of the coupling and also entering recesses therein, so that a good bearing is taken upon the pulley and the end portions of the rope are protected, and the sleeve is held between the parts of the coupling, so that it cannot move endwise.

In the drawings, Figure 1 is a longitudinal section representing a coupling and portions of the ends of the rope with the ring around the coupling, and Fig. 2 is an elevation of the same with a two-part ring.

The rope is of manila, hemp, or other suitable material, the two end portions of which are represented at A A. The coupling is made of metal, and the two portions B and C receive through eyes the strands of the rope, and the strands are spliced or interlaced in any desired manner, as has heretofore been well known, and the couplings themselves are connected together by a screw or otherwise, as has also been well known, and the metal coupling is advantageously made smaller than the fibrous rope. Around the metallic coupling a sleeve or ring D is made use of. This ring is advantageously made of vulcanized fiber, rawhide, leather, or other suitable material cut out or otherwise shaped as a ring, surrounding the metallic coupling to the desired extent.

I recess the surface of the coupling at each side of the joint, as seen at 3 3, to receive the ring D, the exterior diameter of which is to be the same size, or nearly so, as the exterior diameter of the rope to which the coupling is applied, and in all cases it is of greater diameter than the metallic coupling.

By the aforesaid construction the ring or sleeve is held in its proper position by the metallic parts and cannot become displaced endwise, and it may have any desired extent of bearing-surface for resting against the pulley as the joint travels around such pulley.

It is sometimes advantageous to make the ring in two parts, as shown at D', so that one part may be connected with each half of the coupling, and the lateral projections 5 on the respective rings pass into similarly-shaped recesses 6 in the couplings adjacent to the eyes therein, so that they form protectors to the strands of the rope passing through such eyes. In this form the rings and projections remain respectively upon the parts of the couplings, and these can be screwed together or otherwise connected.

I claim as my invention—

1. The combination with the two-part metallic rope-coupling recessed adjacent to the ends that come together, of a ring of vulcanized fiber, leather, or similar material having an exterior diameter larger than the metallic coupling and of the same diameter as the rope or nearly so and held within the recesses of the metallic coupling, substantially as and for the purposes set forth.

2. The combination with the two-part metallic rope-coupling having openings for the rope-strands and recesses adjacent to such openings, of a two-part ring of yielding material adapted to be received between the two parts of the coupling and having lateral projections within the recesses that are adjacent to the openings for the rope-strands, substantially as set forth.

Signed by me this 21st day of December, 1897.

CHAS. W. HUNT.

Witnesses:
GEO. T. PINCKNEY,
S. T. HAVILAND.